United States Patent [19]

McCarthy

[11] 4,157,518

[45] Jun. 5, 1979

[54] LEAKY COAXIAL CABLE HAVING SHIELD LAYER WITH UNIFORM GAP

[75] Inventor: John W. McCarthy, Glen Ellyn, Ill.

[73] Assignee: Belden Corporation, Geneva, Ill.

[21] Appl. No.: 819,364

[22] Filed: Jul. 27, 1977

[51] Int. Cl.² .............................................. H01P 3/06
[52] U.S. Cl. .............................. 333/237; 174/117 FF; 333/236
[58] Field of Search .......................... 333/84 L, 84 R; 343/767, 768, 771, 772; 428/157, 167, 172, 344; 174/117 F, 117 FF, 117 PC, 117 A, 126 C

[56] References Cited

U.S. PATENT DOCUMENTS

| | | | |
|---|---|---|---|
| 2,998,840 | 9/1961 | Davis | 174/117 F |
| 3,090,825 | 5/1963 | Volk | 174/109 |
| 3,149,336 | 9/1964 | Nikolayuk | 343/771 |
| 3,312,774 | 4/1967 | Peterson | 174/120 |
| 3,413,405 | 11/1968 | Myers | 174/36 |
| 3,681,717 | 8/1972 | Martin | 333/84 R |
| 3,749,959 | 7/1973 | Schmersal et al. | 174/117 PC X |
| 3,781,725 | 12/1973 | Yoshida et al. | 333/84 R |
| 3,810,186 | 5/1974 | Nakahara et al. | 343/771 |
| 3,870,977 | 3/1975 | Peoples et al. | 333/84 R |
| 3,909,757 | 9/1975 | Miyamoto et al. | 333/84 L X |

Primary Examiner—Paul L. Gensler
Attorney, Agent, or Firm—Fitch, Even & Tabin

[57] ABSTRACT

A leaky coaxial cable is disclosed having an axial conductor, a dielectric layer coaxial along the length of the conductor and an outer conductive shield coaxial with the dielectric layer. The outer shield comprises a nonconductive elongate film carrier having a pair of spaced electrically conductive foil strips formed thereon which define a uniform width gap therebetween along the length of the film, the film being disposed about the circumference of the dielectric layer such that outer lateral edges of the foil strips overlap and the uniform width gap extends along the length of the cable. The film carrier may be applied on the dielectric layer either longitudinally thereof or by helically winding the film along the length of the dielectric layer. The cable also preferably includes at least one drain wire and an outer protective jacket.

16 Claims, 5 Drawing Figures

LEAKY COAXIAL CABLE HAVING SHIELD LAYER WITH UNIFORM GAP

The present invention relates generally to leaky coaxial cables, and more particularly to a leaky coaxial cable employing a novel electrically conductive outer shield layer which defines a constant width gap along the length of the cable.

The use of coaxial cables for transmitting high frequency signals such as used in radio and television communication systems is well established. In radio communication systems which include in their service areas locations wherein the radiation field is extremely weak or virtually nonexistent, such as in tunnels or in the interiors of buildings, it is known to employ leaky coaxial cables to overcome the difficulty.

Leaky coaxial cables are generally made by forming a single longitudinally extending slot or gap opening in the outer shield layer or by forming a plurality of slots which are of predetermined configuration and angular orientation relative to the axis of the cable so as to effect propagation of radio communication wave energy leakage outwardly from the slot array in the shield layer. The leaked wave energy is polarized and couples with the antenna of a receiver. Examples of leaky coaxial cables having different types of slot or gap arrays in their shield layers are disclosed in U.S. Pat. Nos. 3,781,725, 3,810,186 and 3,909,757. The latter two listed United States Patents disclose leaky coaxial cables wherein continuous gaps are formed between spaced lateral edges of an outer shield conductor which is wrapped coaxially over the insulation or dielectric layer which, in turn, is coaxial along the length of a center conductor. A significant disadvantage of this type of leaky coaxial cable is that the width of the leakage gap so established may vary if the outer shield conductor is folded or creased during wrapping about the dielectric layer, with the result that uniform leakage along the length of the cable is not obtained. Additionally, the time required to apply the outer shield layer in a manner to insure that the lateral edges are not creased or folded and that the gap is uniform between adjacent helical convolutions adds significantly to the manufacturing costs.

One of the primary objects of the present invention is to provide a leaky coaxial cable and method of making the same which overcomes the disadvantages in the prior art leaky coaxial cables through the provision of a novel shield layer which insures a uniform constant gap width throughout the length of the cable.

Another object of the present invention is to provide a leaky coaxial cable which employs an outer shield layer formed by wrapping the insulation layer with a carrier member having affixed thereon conductive foil strips which define one or more continuous uniform width gaps along the longitudinal length of the carrier member so that when the carrier member is disposed coaxially along the length of the insulation layer, the conductive foil strips on the carrier member form a conductive shield except for the continuous uniform gaps along the length of the cable.

A feature of the coaxial cable in accordance with the present invention lies in the provision of a shield layer in the form of a laminated tape comprising a nonconductive film carrier upon which is affixed as by laminating two or more elongate foil conductor strips defining one or more uniform width gaps therebetween along the length of the tape. The tape may be applied coaxially over the insulation layer of a coaxial cable by applying it along the length of the insulation layer either parallel to the axis of the cable or winding it helically around the insulation layer such that the outer lateral edges of the conductive foil strips adjacent the lateral edges of the film carrier overlap and the uniform gaps extend either parallel to the axis of the center conductor or in helical relation therealong. The gap widths are thus unaffected by creasing of the outer lateral edges of the film carrier.

Further objects and advantages of the present invention, together with the organization and manner of operation thereof, will become apparent from the following detailed description of the invention when taken in conjunction with the accompanying drawing wherein like reference numerals designate like elements throughout the several views, and wherein.

Figure 1:
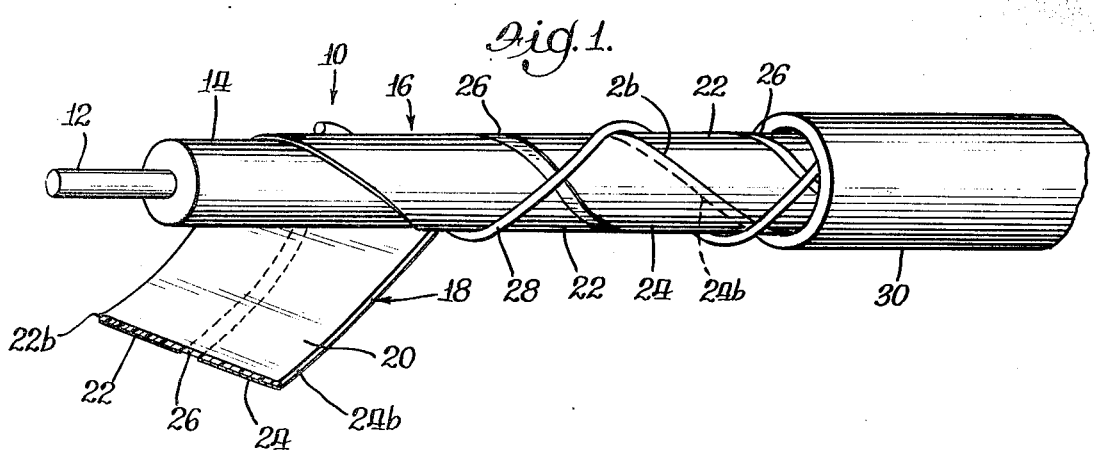
FIG. 1 is a perspective view of a leaky coaxial cable having a shield layer in accordance with one embodiment of the present invention.

Referring to FIG. 1, a leaky coaxial cable constructed in accordance with one embodiment of the present invention is indicated generally at 10. The leaky coaxial cable 10 includes an axial conductor 12 over which an insulation layer 14 is coaxially formed. The insulation layer 14 comprises a suitable dielectric material, such as a low loss cellular polyethylene, and is coaxial along the length of the conductor 12. The leaky coaxial cable 10 further includes a shield layer, indicated generally at 16, which is disposed coaxially over the insulation layer 14 and extends along the longitudinal length of the cable 10.

In accordance with one embodiment of the present invention, the shield layer 16 comprises an elongate laminated tape, indicated generally at 18, which has sufficient flexibility to facilitate wrapping about the length of the insulation layer 14 in forming the leaky coaxial cable 10. The laminated tape 18 includes an electrically nonconductive carrier member 20 which has substantially greater transverse width than thickness. The nonconductive carrier member 20 may comprise a suitable plastic film material, such as polyethylene terephthalate, which provides sufficient carrier strength and flexibility for its subsequent wrapping about the length of the insulation layer 14.

Figure 3:
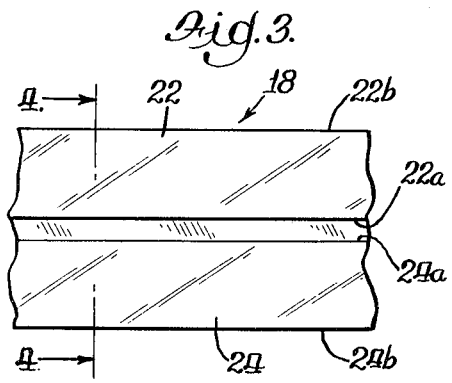
FIG. 3 is a plan view of a length of tape for forming the shield layer of a leaky coaxial cable in accordance with the present invention.
Figure 4:
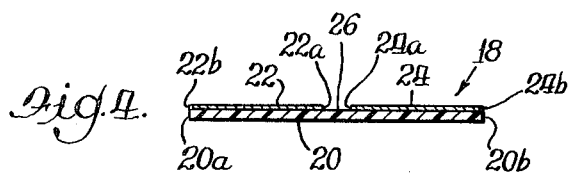
FIG. 4 is a transverse sectional view taken along the line 4—4 of FIG. 3.

Electrically conductive element means in the form of a pair of electrically conductive foil strips 22 and 24 are secured to and carried by the carrier member 20, the foil strips 22 and 24 being affixed to the carrier member 20 as by being laminated therewith or otherwise suitably secured thereon. The conductive foil strips 22 and 24 may be made from relatively thin copper or aluminum foil or other suitably conductive foil material. In the illustrated embodiment, the foil strips 22 and 24 are of identical size and each has substantially greater transverse width than thickness. As best seen in FIGS. 3 and 4, the conductive foil strips 22 and 24 have opposed inner edges 22a and 24a, respectively, which are in parallel spaced relation and define gap means in the form of a longitudinally extending gap 26 therebetween. In the embodiment of FIGS. 1–4, the gap 26 is disposed centrally of the width of the carrier member 20 and extends along the full length thereof, the gap 26 having constant uniform width along its full longitudinal length. In this manner, the strips 22 and 24 define a controlled gap therebetween along the tape 18. The foil strips 22 and 24 have outer lateral edges 22b and 24b, respectively, which terminate at and thereby coincide with outer lateral edges 20a and 20b, respectively, of the nonconductive carrier member 20.

In the embodiment of the leaky coaxial cable 10 illustrated in FIG. 1, the shield layer 16 is formed by wrapping the laminated tape 18 spirally or helically along the length of the insulation layer 14. For this purpose, the surface of the carrier member 20 opposite the conductive strips 22 and 24 may have a suitable adhesive applied thereto. The laminated tape 18 is wound on the insulation layer 14 such that the lateral edges 22b and 24b of the conductive foil strips 22 and 24 overlap when the tape is applied to the insulation layer 14.

A shorting fold (not shown) is made to connect the conductive strips 22 and 24 in a known manner. A drain wire or grounding wire 28 is preferably spirally wound about the conductive shield layer 16 along the longitudinal length of the cable 10. In the embodiment illustrated in FIG. 1, the drain wire 28 is wound about the outer surface of the shield layer 16. As described hereinafter, the tape 18 may be applied to the insulation layer 14 such that the conductive foil strips 22 and 24 face inwardly against the insulation layer 14. In the latter case, the drain wire 28 is preferably wound directly onto the insulation layer to underlie the inwardly facing conductive foil strips 22 and 24. It will be understood that one or more drain wires 28 may be employed taking various configurations as disclosed in U.S. Pat. No. 3,927,247 assigned to the assignee of the present invention. If the foil strips 22 and 24 are approximately 5 mils thick, a drain wire may not be necessary.

Preferably, an outer protective jacket 30 is formed coaxially along the length of the cable 10 to overlie the drain wire 28 and shield layer 16. The jacket 30 may be formed by extrusion and preferably comprises a plastic material such as polyvinyl chloride or polyethylene.

Figure 2:
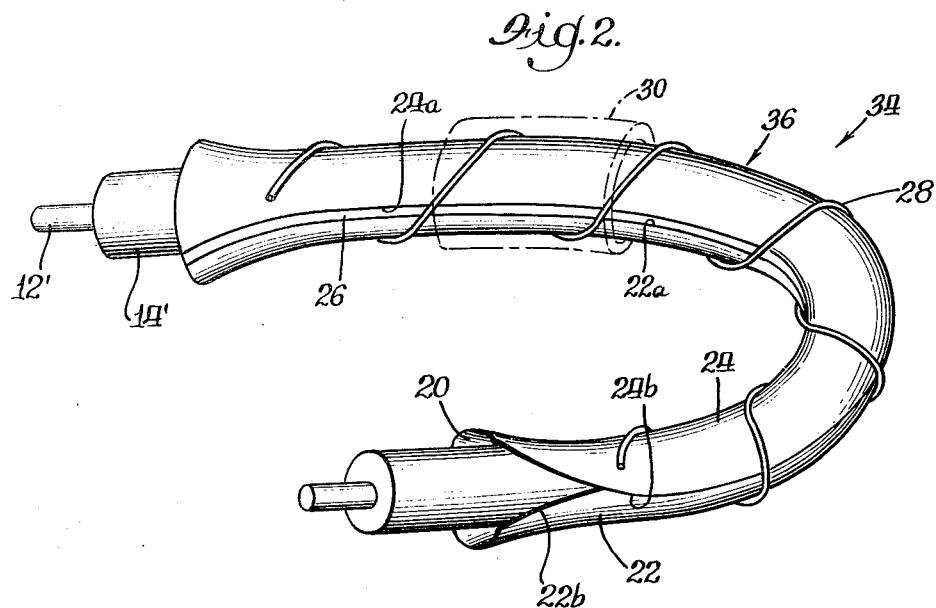
FIG. 2 is a perspective view of a leaky coaxial cable having a shield layer thereon applied in accordance with another embodiment of the present invention.

FIG. 2 illustrates an alternative embodiment of a leaky coaxial cable constructed in accordance with the present invention, such alternative leaky coaxial cable being indicated generally at 34. The leaky coaxial cable 34 includes an axial conductor 12' over which an insulation layer 14' is coaxially disposed, the insulation layer 14' comprising a suitable dielectric material as is known. The leaky coaxial cable 34 employs a shield layer, indicated generally at 36, which is formed from a laminated tape 18 having identical construction to the aforedescribed laminated tape 18 described in respect to FIGS. 1, 3 and 4.

In the embodiment of the leaky coaxial cable 34 shown in FIG. 2, the laminated tape 18 is applied to the insulation layer 14' such that the gap 26 extends along the longitudinal length of the coaxial cable parallel to the axis of the cable so as to be coplanar with the longitudinal axis of the central conductor 12'. To this end, the laminated tape 18 is laid lengthwise along the insulation layer 14' and wrapped thereabout so that the outer lateral edges 22b and 24b of the conductive foil strips 22 and 24 overlap. Again, it can be seen that the gap 26 maintains a constant uniform transverse width along the full longitudinal length of the leaky coaxial cable irrespective of folds or creases in the outer lateral edges of the tape 18.

A drain wire 28 and jacket 30 (shown fragmentarily in phantom) are preferably formed along the length of the cable 34 as described hereinabove in respect to the embodiment of FIG. 1.

Figure 5:
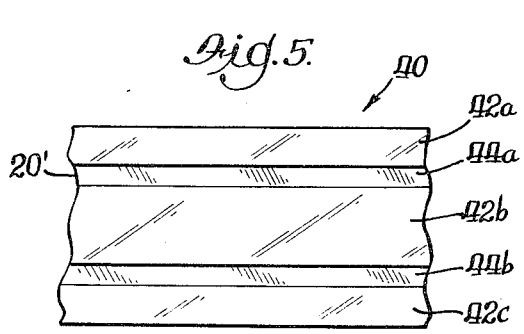
FIG. 5 is a plan view of another embodiment of the tape for forming the shield layer of a leaky coaxial cable in accordance with the present invention.

FIG. 5 illustrates an alternative embodiment of a shield layer tape, indicated generally at 40, in accordance with the present invention. The shield layer tape 40 is generally similar to the aforedescribed shield layer tape 18 except that a plurality of uniform width gaps are formed along the longitudinal length of the tape. More particularly, the tape 40 includes a carrier member 20' identical to the carrier member 20. A plurality of conductive foil strips, there being three conductive foil strips shown at 42a, b and c in FIG. 5, are secured to the carrier 20' as by laminating and define two parallel longitudinal gaps 44a and 44b of constant transverse width between the respective pairs of strips 42a, b and 42b, c. The tape 40 can be applied to either of the dielectric layers 14 or 14' of FIGS. 1 and 2 so that the outer lateral edges of the foil strips 42a, c overlap and the gaps 44a, b extend along the cable either helically or parallel to the axis of the cable. More than two constant width gaps could be formed on the carrier member 20 of FIG. 5 by application of an appropriate number of spaced conductive foil strips.

In both of the embodiments of FIGS. 1 and 2, using either the single gap tape of FIG. 3 or the plural gap tape of FIG. 5, the tapes 18 may be applied to the insulation or dielectric layer so that the conductive foil strips face inwardly and are applied directly against the surface of the dielectric layer. This may be desirable to facilitate stripping of the shield tape layer 18 with the jacket 30. The inwardly facing foil strips and associated carrier film may be secured against the underlying insulation layer by a suitable adhesive.

It will be seen that by forming the shield layer 16 by spirally or helically winding the laminated tape 18 along the length of the insulation layer 14, the gap 26 extends along the full longitudinal length of the resulting leaky coaxial cable 10 and is of constant lateral width. By providing the uniform width gaps along the longitudinal lengths of the tapes spaced inwardly from the lateral edges of the tapes, and by overlapping the outermost lateral edges of contiguous helical convolutions of the tape, as in FIG. 1, or overlapping the outer lateral tape edges of the longitudinal wrap as in FIG. 2, the gap widths are not adversely affected by creases as may occur in the outer lateral edges of the tape during wrapping, thus providing a significant advantage over the prior art leaky coaxial cables.

Thus, in accordance with the present invention, various embodiments of a leaky coaxial cable have been presented which employ a shield layer defining a uniform constant width gap along the length of the cable, the gap being unaffected by creases or folds in the overlapped lateral edges of the shield layer. The novel tape 18 comprising the carrier member 20 and conductive strips 22 and 24 facilitates manufacture of the leaky coaxial cables 10 and 34 in a manner to provide substantially improved performance over the prior art leaky coaxial cables.

While preferred embodiments of the present invention have been illustrated and described, it will be understood to those skilled in the art that changes and modifications may be made therein without departing from the invention in its broader aspects. Various features of the invention are defined in the following claims.

What is claimed is:

1. A leaky coaxial cable comprising an axial electrical conductor, an insulation layer disposed coaxially along the length of said conductor, and an outer shield layer coaxial with said insulation layer along its longitudinal length, said shield layer including an electrically nonconductive carrier member and at least two electrically conductive elements carried by said carrier member along the longitudinal length thereof, said conductive elements defining outer lateral edges and at least one gap of constant width along the length of said cable intermediate the lateral edges of said carrier member, said carrier member being wrapped about the circumference of said insulation layer along the length of said cable such that the outer lateral edges of said conductive elements overlap.

2. A leaky coaxial cable as defined in claim 1 wherein said carrier member comprises a nonconductive film, and wherein said electrically conductive elements comprise electrically conductive foil strips carried by said film, said foil strips being substantially parallel and having opposed parallel spaced edges defining at least one constant width gap therebetween.

3. A leaky coaxial cable as defined in claim 1 wherein said carrier member comprises a nonconductive film having lateral longitudinal edges, said electrically conductive elements having lateral edges coinciding with said lateral edges of said film, said film being wrapped about the circumference of said insulation layer so that said lateral edges of said conductive elements overlap.

4. A leaky coaxial cable as defined in claim 3 wherein said nonconductive film is helically wound along the length of said insulation layer so that said gap extends helically along the cable.

5. A leaky coaxial cable as defined in claim 3 wherein said nonconductive film is wrapped about said insulation layer so that said gap is coplanar with the longitudinal axis of said conductor.

6. A leaky coaxial cable as defined in claim 1 wherein said gap is centered on said carrier member along the length thereof.

7. A leaky coaxial cable as defined in claim 1 including a protective electrically nonconductive jacket layer coaxial over said shield layer along its longitudinal length.

8. A leaky coaxial cable as defined in claim 2 wherein said foil strips are laminated onto said film.

9. A leaky coaxial cable as defined in claim 2 wherein said carrier member is disposed against said insulation layer, and said electrically conductive foil strips face radially outwardly from said carrier member.

10. A leaky coaxial cable as defined in claim 2 wherein said conductive foil strips are of substantially equal transverse width.

11. A leaky coaxial cable as defined in claim 2 including a drain wire carried along the length of said cable in contacting relation with said foil strips.

12. A leaky coaxial cable as defined in claim 2 wherein said carrier member is applied to said insulation layer with said conductive strips facing said insulation layer.

13. A method of making a leaky coaxial cable comprising the steps of: forming a dielectric insulation layer coaxially along the length of an electrical conductor, and forming a shield layer coaxially over said insulation layer, said shield layer comprising an electrically nonconductive carrier member having electrically conductive element means thereon defining outer lateral edges and at least one substantially constant width gap along the longitudinal length of said carrier member, said shield layer being formed by applying said nonconductive carrier member around the circumference of said insulation layer with said lateral edges of said conductive element means in overlapping relation so that said insulation layer is covered by said conductive element means except for said gap which extends along the longitudinal length of the cable.

14. The method as defined in claim 13 wherein said electrically conductive element means comprises at least one pair of electrically conductive foil strips secured on said carrier member, said foil strips having outer lateral edges terminating substantially at the lateral edges of said carrier member and having inner opposed spaced edges defining said constant width gap therebetween, said carrier member being applied on said insulation layer so that said outer lateral edges of said foil strips overlap.

15. The method as defined in claim 13 wherein the step of forming said shield layer comprises applying said carrier member on said insulation layer so that the longitudinal axis of said gap is coplanar with the axis of said conductor.

16. The method as defined in claim 13 wherein said step of forming said shield layer comprises applying said carrier member helically about the circumference of said insulation layer along the length thereof so that said gap is disposed helically along the length of the cable.

* * * * *